(12) United States Patent
Fioroni

(10) Patent No.: US 6,835,033 B2
(45) Date of Patent: Dec. 28, 2004

(54) PARALLEL KINEMATIC STRUCTURE FOR A MACHINE TOOL

(75) Inventor: Claude Fioroni, Castres (FR)

(73) Assignee: Renault Automation Comau, Meudon la Foret Cedex (FR)

( * ) Notice: Subject to any disclaimer, the term of this patent is extended or adjusted under 35 U.S.C. 154(b) by 0 days.

(21) Appl. No.: 10/370,620

(22) Filed: Feb. 24, 2003

(65) Prior Publication Data

US 2003/0129036 A1 Jul. 10, 2003

Related U.S. Application Data

(63) Continuation of application No. 09/701,143, filed on Feb. 2, 2001, now abandoned, which is a continuation of application No. PCT/FR99/01237, filed on May 27, 1999.

(30) Foreign Application Priority Data

May 27, 1998 (FR) .............................................. 98 06668

(51) Int. Cl.[7] ................................................. B23C 1/12
(52) U.S. Cl. ........................ 409/237; 409/235; 409/201; 409/134; 74/490.03; 310/12
(58) Field of Search .............................. 409/201, 211, 409/216, 235, 237, 238, 239, 134, 280, 286; 408/236; 74/490.03, 490.1; 901/22–23; 310/12–14

(56) References Cited

U.S. PATENT DOCUMENTS

| | | | | |
|---|---|---|---|---|
| 4,831,290 A | * | 5/1989 | Clauss et al. .................. 310/12 |
| 4,962,676 A | * | 10/1990 | Vainstock ................... 74/490.1 |
| 4,976,582 A | * | 12/1990 | Clavel ...................... 74/479.01 |
| 5,556,242 A | * | 9/1996 | Sheldon et al. ............. 409/235 |
| 5,782,591 A | * | 7/1998 | Wilkinson, Jr. ............. 409/131 |
| 5,832,783 A | * | 11/1998 | Sheldon ...................... 409/201 |
| 5,916,328 A | * | 6/1999 | Pritschow et al. ........ 74/490.03 |
| 6,116,830 A | * | 9/2000 | Azema ........................ 409/134 |
| 6,285,098 B1 | * | 9/2001 | Nestler et al. .............. 409/235 |
| 6,474,915 B1 | * | 11/2002 | Wildenberg ................. 409/201 |

FOREIGN PATENT DOCUMENTS

| | | | |
|---|---|---|---|
| DE | 19611130 A1 | * | 9/1997 |
| DE | 19806832 A1 | * | 8/1999 |
| EP | 674969 A1 | * | 10/1995 |
| EP | 791438 A2 | * | 8/1997 |
| FR | 2742519 A1 | * | 6/1997 |
| GB | 2308322 A | * | 6/1997 |
| JP | 6-70534 A | * | 3/1994 |
| WO | WO-99/55488 A1 | * | 11/1999 |

* cited by examiner

Primary Examiner—Erica Cadugan
(74) Attorney, Agent, or Firm—Oblon, Spivak, McClelland, Maier & Neustadt, P.C.

(57) ABSTRACT

A device for using a parallel structure designed for positioning and displacing a mobile member including at least a fixed element and at least three actuators each including a fixed part and a mobile part, the mobile member including a support-sheath of a tool spindle. The device includes a balancing assembly which, enabling the support-sheath to move in rectilinear manner along axes X, Y and Z, maintains the support-sheath such that the weight of the support-sheath is not transferred to the parallel structure.

16 Claims, 3 Drawing Sheets

PARALLEL KINEMATIC STRUCTURE FOR A MACHINE TOOL

This application is a Continuation of application Ser. No. 09/701,143 Filed on Feb. 2, 2001, now abandoned, which is a continuation of PCT/FR99/01237 filed May 27, 1999.

FIELD OF THE INVENTION

This invention deals with high speed machining and more particularly with adaptations allowing to displace the tool in optimal conditions for classical machining operations, that is:

drilling, spot facing, tapping, and boring.

DESCRIPTION OF PRIOR ART

In order to perform said operations, machine tools are classically used that, supporting a rotating element, ensure both the displacement of the tool with respect to the subject piece so as to bring it into the machining position and the machining motion of the tool so as to allow it to perform the machining operation.

In the case where the subject piece requires several machining operations and in order to optimize the performing rates of such a piece, a special machine is classically used that is constituted by several parallel and prepositioned broaches comprising a tool each, and that only ensures the machining displacement of the said broaches towards the subject piece in order to allow them to perform the machining operation. These special machines adopt a concept that is classically called "multibroach head concept" used on machines of the transfer type, very much used in the field of high production machining and especially for the machining of automotive pieces.

The machine tool designers, always in order to answer to the optimization criteria of the production rhythms of the subject pieces, were led to specialize their machines, which up to the present constituted the best solution to the production rapidity criterion. Thus, in order to avoid idle machine time and especially the time necessary for machining tool changes, machine tools devote their kinematics only to one machining motion and one multibroach head and are totally dedicated to one machining. This specialization that allows the suppression of all kinematics or mechanical module ensuring other motions or tool changes and thus the improvement of the performing velocity of said machines as well as the production turnout, resulted however in the fact that their user was unable to reconvert them to another machining operation, especially when the product, comprising the subject piece requiring one of the machining operations performed by said machine tool, was abandoned and is no longer present or necessary on the market for which it was intended.

As the lifetime of products and especially of those intended for cars diminishes every day, the implementation of a transfer machine totally dedicated to the machining of only one piece, the product that includes it being subject to a very quick disappearance, becomes very rapidly a very heavy investment.

The recent developments of high speed machining associated with the use of a logical structure of a positioning with parallel architecture allow to contemplate a machining by means of a monobroach head and thus monotool with times comparable to those of an average machining by means of a multibroach head.

The main feature of a parallel structure consists in the fact that the setting into action of the mobile element on an axis does not require the setting into action of kinematic acting elements and devices necessary for the setting into action of said mobile element on other axis, which allows obtaining the above mentioned machining times. Thus, the parallel structure adopts a kinematics of the type that ensures the positioning and displacement of a mobile element and includes at least a fixed element, at least a mobile element and at least three acting elements, each comprising a fixed part and a mobile part, the fixed part of each acting element being interdependent with the fixed element, the mobile part of each acting element being interdependent with the mobile element by means of a linkage element.

The applicant noticed that the implementation of a logical structure with parallel architecture in order to apply it concretely in the industry or in a machining chain, presents many difficulties that led machine tool designers to remain at the prototype stages or to use doubtful compromises in the required technological choices, compromises diminishing the capacities contemplated in theory in a machine tool with parallel structure.

One of the drawbacks of such a structure consists in the multiplication of joints, one of the consequences of which is that the broach maintained at the end of the positioning arms creates an important lever crank with respect to the basis of the positioning arms and which is difficult to set. The solution to this lever crank problem was, for the time being, to place the axis of the broach and thus of the tool vertically, so that the gravity effects on the machining head are taken into account by the acting elements of the positioning arms.

Another drawback of the machine tools with parallel structure consists in the fact that they were designed with a total flexibility, that is with a broach able to be oriented according to six degrees of freedom including the possibility to change tools. This multiplication of functions of a machine tool slows down its machining capacity by multiplying idle machine times.

An implementation example in the field of machining with parallel structure is described in document n°EP 0791438. This document describes a possibility to embody a machine tool, the tool holder's slide of which would be in a horizontal position. This possibility constitutes one of the hereabove mentioned compromises, in that the motion along the slide axis is not obtained through the parallel structure but through an independent motorization associated with a slide-holder sheath that is itself linked to the parallel structure. Thus, in this implementation possibility, the parallel structure ensures the motion of the slide-holder sheath along a vertical plane perpendicular to the axis of the slide itself, and the slide-holder sheath itself ensures the translation motion of the slide along its axis perpendicular to the above mentioned plane. This particular configuration is due to the above mentioned difficulties of embodying the actionning and the putting into motion of a slide-holder associated with a parallel structure implementing a plurality of joints.

SHORT DESCRIPTION OF THE INVENTION

Having noticed these facts, the applicant led researches on a preferred embodiment of a parallel structure, that is of the type where each linkage element is flexibly mounted on one hand on the mobile part of the acting element and flexibly mounted on the other hand on the mobile element, and of the type where the whole is arranged so as to the inclination and orientation in space of the mobile element remain unchanged, whatever the motions of the mobile parts of the acting elements, in order to constitute a moldable parallelogram, the mobile element being constituted by a support-sheath of a tool-holder broach and the aforesaid parallel structure being arranged so that the axis of the broach is horizontal.

These researches led to a new and creative implementation of a parallel structure allowing to keep all the advantages of a parallel structure while adapting it in an optimal manner to a specific application of the machining field.

According to the main feature of the invention, the implementation device of a parallel structure is remarkable in that it comprises a balancing means that is constituted of a guiding module of said support-sheath along an horizontal axis associated with a support module constituted by a jack that, allowing the displacement of said guiding module along a vertical plane perpendicular to the axis of the broach and allowing the rectilinear motions of said support-sheath along the X, Y and Z axis, supports the assembly support-sheath, broach and tool, so that the weight of the latter would not be transferred on said parallel structure.

The motions of the parallel structure of the invention are voluntary limited so as to diminish the number of parameters to be handled and because of the choice made by the applicant who only wants to use this kinematic structure for some applications for which it is particularly intended.

This orientation is especially advantageous in that it allows the performance of the same works as those obtained by specialized machine tools making up the transfer machines, and therefore facilitate the integration of a machine tool adopting such a structure in a classical machining chain.

Such an orientation is new and runs counter to any other machine tool concepts adopting a parallel structure in that the machine tool adopting such a structure will be limited to straight machinings. This new and particularly advantageous orientation of the logical structure of the device according to the invention, that is ensuring the rectilinear motions of a mobile element with horizontal axis, requires special implementation means, in particular a balancing device.

Contrary to the document mentioned in the prior art, this device allows the parallel structure to ensure the rectilinear motions of the slide along the three axis of motion. Thus, the device according to the invention allows to take advantage of all the possibilities of a parallel structure in the framework of rectilinear motions.

Another object of the invention deals with the machine tool adopting a device corresponding to the invention. The fundamental concepts of the invention having just been presented in their most elementary form, other details and features will come forth more clearly when reading the following description giving, as a non limiting example and with respect to the attached drawings, an embodiment of a device implementing a logical structure with parallel architecture according to the invention.

SHORT DESCRIPTION OF THE DRAWINGS

DESCRIPTION OF THE EMBODIMENTS

Figure 1:
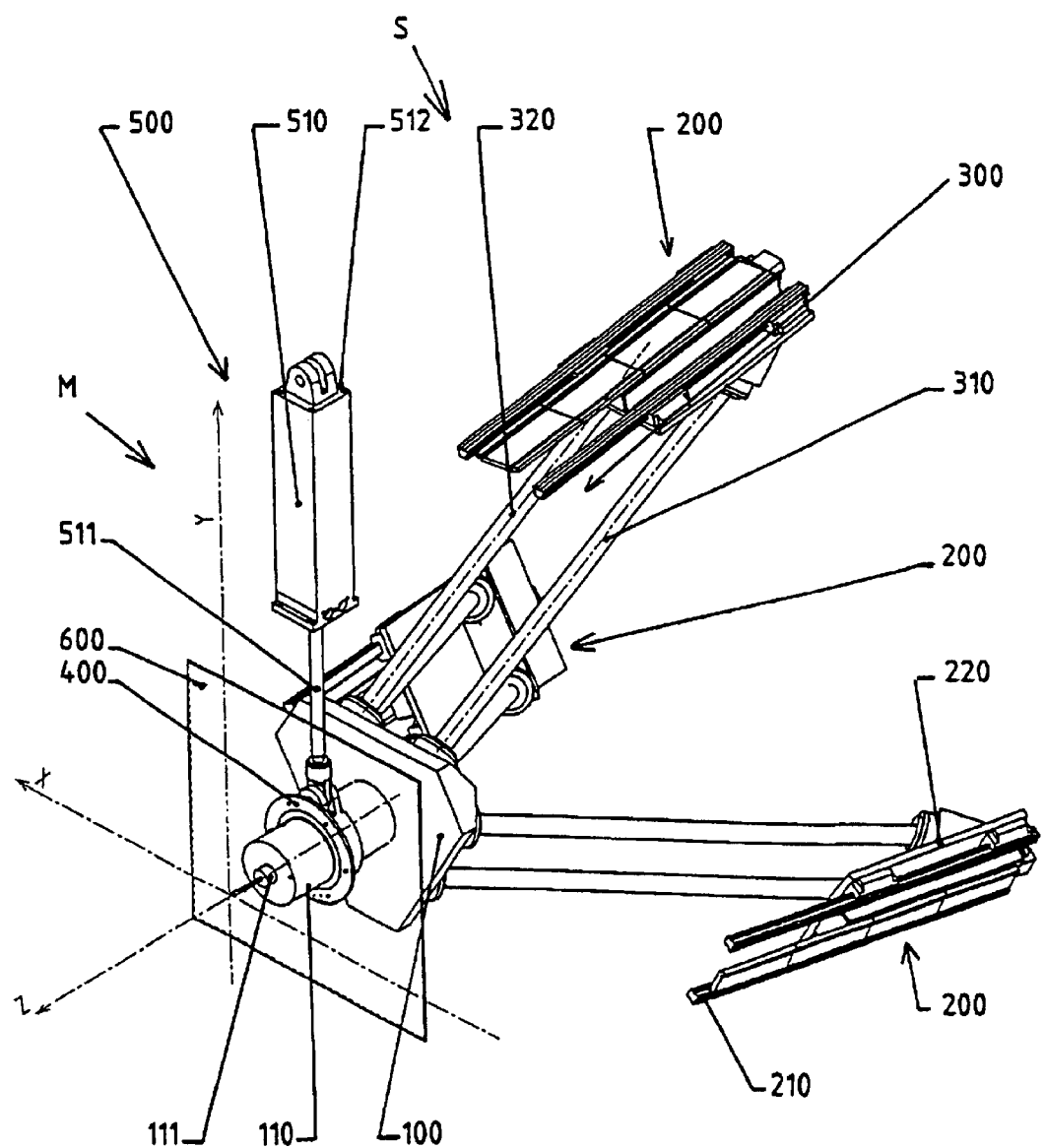
FIG. 1 is a schematic and global view in three dimensions of an embodiment of a device implementing a logical structure.

Such as shown on the drawing of FIG. 1, the parallel structure referenced S in its whole is of the type that ensures the positioning and the displacement of a mobile element 100 and comprises at least one fixed element, at least one mobile element 100 and at least three acting elements 200 comprising each a fixed part 210 and a mobile part 220, the fixed part 210 of each acting element 200 being interdependent with the fixed element, the mobile part 220 of each acting element 200 being interdependent with the mobile element 100 by means of a linkage element 300, which is here constituted by a pair of arms 310, 320. Each of the linkage elements 300 being flexibly mounted on one hand on the mobile part 220 of the acting element 200 and flexibly mounted on the other hand on the mobile element 100.

The whole parallel structure is arranged here so that the inclination and orientation in space of the mobile element 100 remain unchanged, whatever the motions of the mobile parts 220 of the acting elements 200, in order to constitute a moldable parallelogram, the mobile element 100 being constituted by a support-sheath 110 of a tool-holder broach 111.

According to a particularly advantageous embodiment, the aforesaid parallel structure S is arranged sot that the axis of the broach 111 is horizontal.

In order to allow an horizontal station to such a jointed structure, the device allowing its implementation comprises a balancing means M that, allowing the rectilinear motions of said support-sheath 110 along the X, Y and Z axis, supports the assembly support-sheath 100, broach 111 and tool, so that the weight of the latter is not transferred on said parallel structure S.

According to a preferential embodiment, said balancing means M is comprised of a guiding module 400 of said support-sheath 110 along an horizontal axis associated with a support module 500 that, allowing the displacement of said guiding module 400 along a vertical plane perpendicular to the axis of the broach 111, ensures its support in this plane.

According to the especially judicious and illustrated choice of embodiments, the support-sheath 110 adopts an external cylindrical shape, which implies a particularly advantageous feature of the device of the invention, in that the aforesaid guiding module 400 is constituted of a guiding ring ensuring the function of a sliding bearing for the aforesaid cylinder 110 along the horizontal axis Z.

According to a preferred embodiment, said sliding bearing is a bearing of the aerostatic type.

A first advantage to the use of an aerostatic bearing is that it suppresses the frictional forces in the guiding it ensures.

Moreover, the aforesaid guiding module 400 of said support-sheath 110 is interdependent with a protection wall 600 that, separating the machining zone per say from the drive zone occupied by said parallel structure S, follows the motions of said guiding module 400 in the vertical plane perpendicular to the axis of the support-sheath 110.

Thus, the use of an aerostatic bearing is particularly advantageous in that it not only guides the support-sheath 110 but also ensures an optimal sealing between the machining zone and the drive zone by means of an air flow characterizing it, and that in a place where theoretically the sealing is at its lowest.

As shown, the aforesaid support module 500 of said guiding module 400 is constituted by at least a jack 510, the end of the rod 511 of which is associated in a flexible manner with said guiding module 400, and the body 512 of which is associated in a flexible manner with a fixed point with respect to said guiding module 400, that is the frame not shown of the machine tool. As the motions of the guiding module are rectilinear, the joints linking the body 512 of the jack 510 to the frame and the end of rod 511 of the jack 510 to said guiding module 400 are constituted by linkages of the pivot type, the axis of which is here parallel to the axis of the broach 111. The association of these two linkages of the pivot type to the translation of the rod 511 of the jack 510 allows the guiding module 500 to ensure the balancing of the structure by following the motions of the guiding module 400 in the plane vertical perpendicular to the axis of the broach 110.

According to a preferred but not limiting embodiment, said jack is of the pneumatic type.

FIG. 1 of the attached drawing represents the inside of a machine tool adopting the device according the above mentioned features. This machine tool, the internal structure of which is solely represented, comprises a protection wall 600 separating the machining zone from the drive zone following the evolution of a mobile element constituted here by the support-sheath 100 going through it in a vertical plane perpendicular to the axis of said mobile element 110, said mobile element 110 being guided by an aerostatic bearing 400 interdependent with said protecting wall 600 and linked in a flexible manner, on its part located in the drive zone at the end of the rod 511 of a balancing jack 510, the body 512 of which is linked in a flexible manner to the frame of said machine tool, which is not shown.

According to the shown embodiment, the acting elements ensuring the setting into action of the ends of the positioning arms 310, 320 to which they are linked, are constituted by linear motors coupled to guiding means interdependent with the frame of the machine tool. This technological choice is of course not limiting, any type of acting element being likely to set into action the pairs of arms constituting said parallel structure S.

Figure 2:
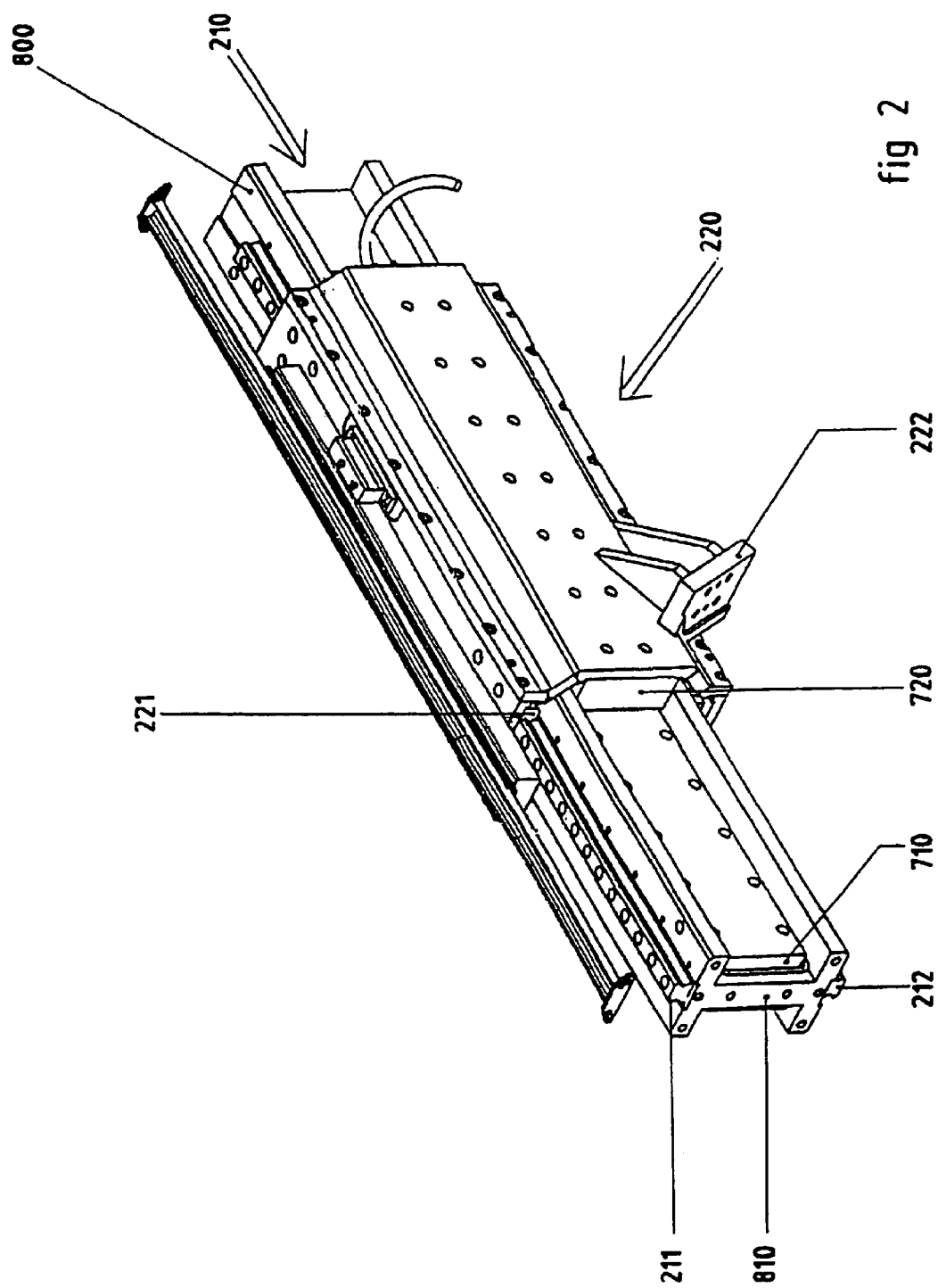
FIG. 2 is a schematic view in detailed perspective of the arrangement of the acting elements ensuring the setting into action.

According to a particularly advantageous embodiment, each acting element is each constituted by two linear motors for which the applicant imagined a particularly advantageous arrangement shown on the drawing of FIG. 2 of said motors within the framework of such a drive solution.

Such as shown on said drawing, both linear motors being constituted of a primary block 720 and a secondary block 710, the machine tool is remarkable in that the motors are associated opposite each other with a symmetrical beam 800, the section of which comprises at least one plane part 810 in order to receive on each side the secondary blocks 710 of the two linear motors and which is associated with at least one guiding element, said main guiding element 211, of the linear motion created between the primary block 720 and the secondary block 710 of said linear motors.

According to another particularly advantageous feature of the invention, the primary blocks 720 of the linear motors are fixed opposite each other and spaced apart from one another by means of a case comprising at least one guiding element, said secondary guiding element 221, complementary to said main guiding element 211, the assembly formed by said beam 800, the secondary blocks 710 and the main guiding element 211 entering into said case so that the primary blocks 720 place themselves opposite each other with their respective secondary block 710 and that the guiding in translation of the motion created between the different blocks of the linear motors is ensured by the association of the main guiding element 211 and the secondary guiding element 221.

This drive concept by means of linear motors is particularly creative in that it provides the functions of high speed linear electrical jack, the mobile part being indifferently the beam 800 or the case supporting the primary blocks 720 of the linear motors.

Moreover, according to the shown and non limiting embodiment, the case is preformed so as to be arranged around the fixed assembly made up by the beam 800, the two secondary blocks of the linear motors 710 and the main guiding elements 211 and 212. Thus, the case forms a guiding and drive bearing to the beam 800 and the beam constitutes the fixed part of a linear jack, the mobile part of which is constituted by the case.

According to a preferred but not limiting embodiment, the support-case of the primary blocks 720 is mobile and constitutes the mobile part 220 of the acting elements 200 with respect to said beam 800, support of the secondary blocks 710, said beam being attached and interdependent with the frame of said machine tool.

According to a particularly advantageous embodiment, the section of the support-beam 800 constituted by an "I", the vertical plane part of which receives on each side the secondary block 710 of the two linear motors, and the horizontal plane parts of which receive the fixed guiding parts 211 and 212, said main guiding elements, of the mobile part 220 of the acting elements 200.

The use of a symmetrical support-beam 800 adopting a plane part 810 allows the secondary blocks 710 of the linear motors to be mounted so that the attraction strains of said motors are balanced.

Indeed, said mobile part 220 constituted by the case, comprises the means 222 allowing the reception of the ends of the pair of arms. Consequently, this mobile part is particularly compact and also adopts a symmetrical structure. This symmetry and compactness are particularly advantageous in that one of the main drawbacks of a parallel structure consists in the volume necessary to the motions of the arms or linkage elements 300 as well as to their drive. Moreover, the symmetry allows the reduction of the number of different pieces in order to obtain said acting element 200.

According to another particularly judicious technical feature, the support-case of the primary blocks 720 of the linear motors and constituting the mobile part 220 of the acting elements 200 is associated with a linear position transducer, the mobile part of which is associated with the mobile part 220 of the acting elements 200 and the fixed part of which is associated with the support-beam 800. Thus, the drive module shown in FIG. 2 and imagined within the framework of the drive of the parallel structure is an independent unit constituting a wholly digitalised axis being able to be applied to any type of application of driving in translation.

Figure 3:
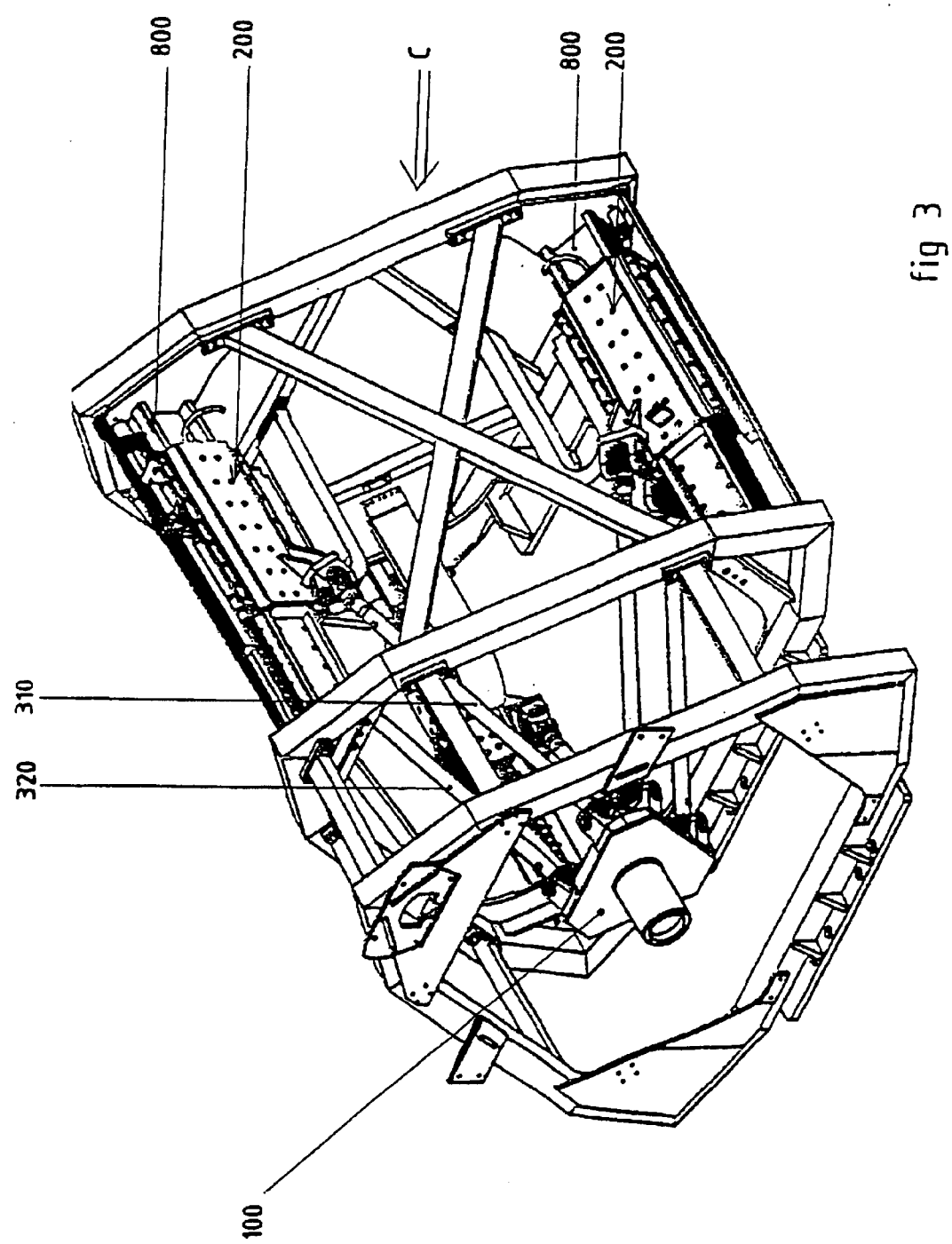
FIG. 3 is a schematic view in global perspective of a frame of an embodiment of the frame of a machine tool adopting the arrangement of the acting elements shown in FIG. 2.

Such as shown on the drawing of FIG. 3, the underframe, globally referenced C, of the frame of the machine tool mainly adopts the external shape of an equilateral triangle, the angles of which receive the support-beams 800 of the mobile parts 220 of the acting elements 200. This triangular structure is particularly advantageous in that it optimizes the compactness of the machine tool.

According to a particularly judicious embodiment for the full operation of a machine tool using a device corresponding to the invention, the motions of the logical structure S are such that said mobile element 110 follows the rectilinear positioning motions of the tool as well as a rectilinear machining motion parallel to the horizontal axis of said mobile element 100, so that said machine tool is dedicated to machining operations such as drilling, spot facing, tapping, and boring.

This feature is particularly advantageous in that it achieves an optimal fit between the capacities of a machine tool using a logical structure with parallel architecture such as implemented by the device according to the invention and an application in the transfer machine field. Indeed, such a machine tool, by limiting itself in its motions, displays higher performances in the domain of displacement speeds to those of multibroach machine tools totally dedicated to one machining, which allows to contemplate equivalent machining times for a same phase but also allows the change of tools as well as a change of tool positioning and in so doing, the reconversion of a transfer machine composed of machine tools corresponding to the invention.

Thus, this machine tool can be integrated in a high rate machine of the transfer of pieces type as a universal station for drilling, spot facing, tapping, and boring, said machine being wholly convertible for other productions.

It can be understood that the device for the implementation of a parallel structure being described and shown hereabove, was described and shown in view of publication rather than limitation.

What is claimed is:

1. A device configured to permit positioning and displacement of a mobile element, comprising:
    a parallel structure comprising:
    a fixed element;
    three acting elements, each comprising a fixed part and a mobile part, the fixed part being interdependent with the fixed element, the mobile part being interdependent with the mobile element, and
    three linkage elements, each including a first end mounting with the mobile part and a second end mounting with the mobile element, the three linkage elements configured to maintain an inclination and an orientation of the mobile element regardless of a movement of the mobile parts; and
    a balancing means comprising:
        a linking module connecting with the mobile element; and
        a support module connecting with the linking module,
    wherein the mobile element comprises a support-sheath of a tool-holder, the longitudinal tool-holding axis of the support-sheath extending along a horizontal axis, and
    wherein the support module is configured to permit rectilinear motion of said support-sheath along at least one of an X, Y, and Z axis, and to support the support-sheath such that a weight of the support-sheath is not transferred to said parallel structure.

2. The device according to claim 1, wherein the support-sheath comprises an external cylindrical shape.

3. The device according to claim 1, further comprising:
    a protection wall configured to separate a machining zone from a drive zone occupied by said parallel structure and to follow a motion of said support-sheath in a vertical plane perpendicular to the horizontal axis.

4. A machine tool comprising:
    the device according to claim 1, and
    a protection wall configured to separate a machining zone from a drive zone of the parallel structure,
    wherein the support module is connected to a frame, and the fixed element is connected to the frame.

5. The machine tool according to claim 4, wherein each of the acting elements comprise a linear motor.

6. The machine tool according to claim 5, wherein at least one of the linear motors is associated with a symmetrical beam comprising a plane part receiving the linear motor.

7. The device according to claim 1, wherein the support sheath is configured to rotate about the horizontal axis.

8. The device according to claim 7, wherein a tool held by the support-sheath is configured to perform one of drilling, tapping, spot facing, and boring.

9. The device according to claim 1, wherein the fixed element is connected to a frame, and the balancing means comprises a first end connected to the frame and a second end connected to the support-sheath.

10. The device according to claim 9, wherein the first end is configured to pivot about the horizontal axis.

11. A tool positioning device, comprising:
    a parallel structure comprising a plurality of linkage elements having first ends connected to a frame and second ends connected to a tool-holder extending along and configured to rotate about a horizontal axis; and
    a balancing unit configured to support the weight of the tool-holder such that the weight of the tool-holder is not transferred to said parallel structure, the balancing unit comprising a first end connected to the frame and a second end connected to the tool-holder.

12. The device according to claim 11, wherein a tool held by the tool-holder is configured to perform one of drilling, tapping, spot facing, and boring.

13. The device according to claim 11, wherein a tool held by the tool-holder is configured to perform a material removal operation.

14. The device according to claim 11, wherein the balancing unit comprises a jack.

15. The device according to claim 11, wherein the first end of the balancing unit is configured to rotate about the horizontal axis, and the second end is configured to extend linearly from the first end.

16. The device according to claim 11, wherein the second end of the balancing unit is configured to remain in a same vertical plane regardless of a position of the tool-holder.

* * * * *

UNITED STATES PATENT AND TRADEMARK OFFICE
CERTIFICATE OF CORRECTION

PATENT NO. : 6,835,033 B2
DATED : December 28, 2004
INVENTOR(S) : Fioroni

It is certified that error appears in the above-identified patent and that said Letters Patent is hereby corrected as shown below:

Title page,
Item [63], Related U.S. Application Data, should read:
-- Related U.S. Application Data
[63] Continuation of application No. 09/701,143, filed on Feb. 2, 2001, now abandoned, filed as application No. PCT/FR99/01237, filed May 27, 1999. --

Column 1,
Line 3, should read:
-- This application is a Continuation of application Ser. No. 09/701,143 filed on Feb. 2, 2001, now abandoned, filed as application No. PCT/FR99/01237, filed May 27, 1999. --

Signed and Sealed this

Fifth Day of April, 2005

JON W. DUDAS
*Director of the United States Patent and Trademark Office*